UNITED STATES PATENT OFFICE.

HEINRICH SEIDEL, OF VIENNA, AUSTRIA-HUNGARY, ASSIGNOR TO KALLE AND COMPANY, OF BIEBRICH-ON-THE-RHINE, GERMANY.

BROWN SULFUR DYE.

SPECIFICATION forming part of Letters Patent No. 687,581, dated November 26, 1901.

Application filed March 6, 1900. Serial No. 7,655. (Specimens.)

*To all whom it may concern:*

Be it known that I, HEINRICH SEIDEL, a subject of the Emperor of Austria-Hungary, residing at Vienna, Austria-Hungary, have invented certain new and useful Improvements in the Manufacture of a New Cotton Dye Containing Sulfur, of which the following is a specification.

The manufacture of cellulose is nowadays almost generally carried out in such a manner that wood-pulp is treated in closed vessels under pressure with calcium or magnesium bisulfite. By this treatment the cellulose fiber is not attacked in any way, while the incrusting substance of the wood enters into chemical combination with the bisulfite and is thereby dissolved and extracted from the cellulose. The so-obtained waste lyes of the manufacture of sulfite cellulose are a burden for this branch of the industry. No sufficient use having been found for it, it has mostly served to poison the rivers. I have now found that from these waste lyes by neutralizing and concentrating them to a certain degree and by fusing them together with sodium sulfid and sulfur a very useful coloring-matter is obtained, which dyes brown shades of excellent fastness on unmordanted cotton from a bath made up with salt and sodium sulfid. Still more favorable results are obtained if the waste lye is freed from lime by a treatment with sodium carbonate before it is concentrated and introduced into the melting process. The formation of the new dyestuff takes place at temperatures between 150° and 280° centigrade and is finished as soon as the melted mass becomes dry and friable. If the process is carried out at a temperature above 200°, it is advisable to exclude the air during the last part of the operation and during the cooling of the product. In this manner a black amorphous mass is obtained which is perfectly soluble in water. The aqueous solution can be used directly for dyeing cotton.

In the following I give an example for the production of the new coloring-matter; but I do not bind myself to the relative quantities and the temperatures mentioned.

Thirty kilos of crystallized sodium sulfid are melted in an iron pan under addition of a small quantity of water. Twenty kilos of a sulfite waste lye from which the calcium has been previously precipitated and which has been concentrated up to a density of 28° Baumé are then mixed with the melted sulfid. Seven kilos of finely-ground sulfur are now added and the temperature raised, while stirring well, to 120° to 130° centigrade until the mass begins to turn tough. It is then introduced into a drying or baking stove, heated to a temperature of about 180° centigrade, and kept there until it is quite dry and friable. The so-obtained product represents after being ground a black powder, easily soluble in water, with a deep-brown color, insoluble in alcohol and soluble in concentrated sulfuric acid with brown color. The solution in concentrated sulfuric acid yields on addition of water a dark-brown precipitate. The aqueous solution is not changed by caustic-soda lye. An addition of hydrochloric acid produces a dark-brown precipitate.

The new coloring-matter dyes a deep brown on unmordanted cotton from a bath made up with sodium sulfid and Glauber salt or common salt. The fastness of the dyeings is increased by a subsequent treatment with chromium, copper, or iron salts.

Now what I claim is—

The new dyestuff containing sulfur, which is obtained by fusing waste lye resulting from the manufacture of sulfite cellulose after concentration together with alkaline sulfids and sulfur, and keeping the so-obtained mass at an elevated temperature until it is quite dry and friable; which represents after being ground a black powder easily soluble in water, or concentrated sulfuric acid with brown color, insoluble in alcohol, the solution of which in concentrated sulfuric acid yields a dark-brown precipitate on addition of water, the aqueous solution of which is not changed by caustic-soda lye and it is precipitated by hydrochloric acid, and which dyes a deep brown on unmordanted cotton from a bath made up with Glauber or common salt and sodium sulfid, producing shades the fastness of which is increased by a subsequent treatment with chromium, copper or iron salts.

In testimony whereof I have signed my name to this specification in the presence of two subscribing witnesses.

HEINRICH SEIDEL.

Witnesses:
 ALVESTO S. HOGUE,
 AUGUST FUGGER.